(12) United States Patent
Power et al.

(10) Patent No.: US 6,225,422 B1
(45) Date of Patent: *May 1, 2001

(54) GAS FLUIDIZED BED POLYMERIZATION PROCESS FOR OLEFINS

(75) Inventors: Michael Bernard Power, London (GB); Jean-Claude Chinh, St. Mitre les Remparts (FR)

(73) Assignee: BP Chemicals Limited, London (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/907,875

(22) Filed: Aug. 11, 1997

(30) Foreign Application Priority Data

Aug. 13, 1996 (EP) .................................. 96430011

(51) Int. Cl.$^7$ ........................................ C08F 2/34
(52) U.S. Cl. .................. 526/68; 526/67; 526/69; 526/70
(58) Field of Search ................ 526/67, 68, 69, 526/70

(56) References Cited

U.S. PATENT DOCUMENTS

| | | | |
|---|---|---|---|
| 4,588,790 | * | 5/1986 | Jenkins, III et al. .................. 526/70 |
| 4,640,963 | * | 2/1987 | Kreider et al. .......................... 526/67 |
| 5,436,304 | | 7/1995 | Griffin et al. . |
| 5,521,264 | | 5/1996 | Mehra et al. . |
| 5,541,270 | * | 7/1996 | Chinh et al. ............................ 526/68 |

FOREIGN PATENT DOCUMENTS

| | | |
|---|---|---|
| 0 089 691 | 9/1983 | (EP) . |
| 0 173 261 | 3/1986 | (EP) . |
| 94/25495 | 11/1994 | (WO) . |
| 94/28032 * | 12/1994 | (WO) . |
| 96/10590 | 4/1996 | (WO) . |

* cited by examiner

*Primary Examiner*—David W. Wu
*Assistant Examiner*—R. Rabago
(74) *Attorney, Agent, or Firm*—Finnegan, Henderson, Farabow, Garrett and Dunner, L.L.P.

(57) ABSTRACT

A process for the continuous gas fluidised bed polymerisation of olefins, especially ethylene, propylene, or mixtures of these with other alpha olefins, wherein the monomer containing recycle gas employed to fluidise the bed is passed through a separator. The separator is charged with and maintained at least partially filled with liquid. Entrained catalyst and/or polymer particles are separated from the recycle gas in the separator and these separated particles are maintained in a suspended state in the liquid in the separator. The recycle stream can be cooled to condense out at least some liquid hydrocarbon; the condensed liquid, which can be a monomer or an inert liquid, is separated from the recycle gas in the separator and is fed directly to the bed to produce cooling by latent heat of evaporation. The process reduces fouling of the separator.

12 Claims, 1 Drawing Sheet

GAS FLUIDIZED BED POLYMERIZATION PROCESS FOR OLEFINS

BACKGROUND OF THE INVENTION

The present invention relates to a continuous process for the gas-phase polymerisation of olefins in a fluidised bed reactor.

Processes for the homopolymerisation and copolymerisation of olefins in the gas phase are well known in the art. Such processes can be conducted for example by introducing the gaseous monomer into a stirred and/or fluidised bed comprising polyolefin and a catalyst for the polymerisation.

In the fluidised bed polymerisation of olefins, the polymerisation is conducted in a fluidised bed reactor wherein a bed of polymer particles is maintained in a fluidised state by means of an ascending gas stream comprising the gaseous reaction monomer. The start-up of such a polymerisation generally employs a bed of polymer particles similar to the polymer which it is desired to manufacture. During the course of polymerisation, fresh polymer is generated by the catalytic polymerisation of the monomer, and polymer product is withdrawn to maintain the bed at more or less constant volume. An industrially favoured process employs a fluidisation grid to distribute the fluidising gas to the bed, and to act as a support for the bed when the supply of gas is cut off. The polymer produced is generally withdrawn from the reactor via a discharge conduit arranged in the lower portion of the reactor, near the fluidisation grid. The fluidised bed comprises a bed of growing polymer particles. This bed is maintained in a fluidised condition by the continuous upward flow from the base of the reactor of a fluidising gas.

The polymerisation of olefins is an exothermic reaction and it is therefore necessary to provide means to cool the bed to remove the heat of polymerisation. In the absence of such cooling the bed would increase in temperature and, for example, the catalyst becomes inactive or the bed commences to fuse. In the fluidised bed polymerisation of olefins, the preferred method for removing the heat of polymerisation is by supplying to the polymerisation reactor a gas, the fluidising gas, which is at a temperature lower than the desired polymerisation temperature, passing the gas through the fluidised bed to conduct away the heat of polymerisation, removing the gas from the reactor and cooling it by passage through an external heat exchanger, and recycling it to the bed. The temperature of the recycle gas can be adjusted in the heat exchanger to maintain the fluidised bed at the desired polymerisation temperature. In this method of polymerising alpha olefins, the recycle gas generally comprises the monomeric olefin, optionally together with, for example, an inert diluent gas such as nitrogen or a gaseous chain transfer agent such as hydrogen. Thus, the recycle gas serves to supply the monomer to the bed, to fluidise the bed, and to maintain the bed at the desired temperature. Monomers consumed by the polymerisation reaction are normally replaced by adding make up gas to the recycle gas stream.

It is well known that the production rate (i.e. the space time yield in terms of weight of polymer produced per unit volume of reactor space per unit time) in commercial gas fluidised bed reactors of the afore-mentioned type is restricted by the maximum rate at which heat can be removed from the reactor. The rate of heat removal can be increased for example, by increasing the velocity of the recycle gas and/or reducing the temperature of the recycle gas and/or changing the heat capacity of the recycle gas. However, there is a limit to the velocity of the recycle gas which can be used in commercial practice. Beyond this limit the bed can become unstable or even lift out of the reactor in the gas stream, leading to blockage of the recycle line and damage to the recycle gas compressor or blower. There is also a limit on the extent to which the recycle gas can be cooled in practice. This is primarily determined by economic considerations, and in practise is normally determined by the temperature of the industrial cooling water available on site. Refrigeration can be employed if desired, but this adds to the production costs.

The prior art suggests a number of methods for increasing the heat removal capacity of the recycle stream, for example, by introducing a volatile liquid.

EP 89691 relates to a process for increasing the space time yield in continuous gas fluidised bed processes for the polymerisation of fluid monomers, the process comprising cooling part or all of the unreacted fluids to form a two phase mixture of gas and entrained liquid below the dew point and reintroducing said two phase mixture into the reactor. The specification of EP 89691 states that a primary limitation on the extent to which the recycle gas stream can be cooled below the dew point is in the requirement that the gas-to-liquid ratio be maintained at a level sufficient to keep the liquid phase of the two phase fluid mixture in an entrained or suspended condition until the liquid is vaporised, and further states that the quantity of liquid in the gas phase should not exceed about 20 weight percent, and preferably should not exceed about 10 weight percent, provided always that the velocity of the two phase recycle stream is high enough to keep the liquid phase in suspension in the gas and to support the fluidised bed within the reactor. EP 89691 further discloses that it is possible to form a two-phase fluid stream within the reactor at the point of injection by separately injecting gas and liquid under conditions which will produce a two phase stream, but that there is little advantage seen in operating in this fashion due to the added and unnecessary burden and cost of separating the gas and liquid phases after cooling.

EP 173261 relates to a particular means for introducing a recycle stream into fluidised bed reactors and, in particular, to a means for introducing a recycle stream comprising a two phase mixture of gas and entrained liquid as described in EP 89691 (supra).

WO 94/25495 describes a fluidised bed polymerisation process comprising passing a gaseous stream comprising monomer through a fluidised bed reactor in the presence of a catalyst under reactive conditions to produce polymeric product and a stream comprising unreacted monomer gases, compressing and cooling said stream, mixing said stream with feed components and returning a gas and liquid phase to said reactor, a method of determining stable operating conditions which comprises: (a) observing fluidised bulk density changes in the reactor associated with changes in the composition of the fluidising medium; and (b) increasing the cooling capacity of the recycle stream by changing the composition without exceeding the level at which a reduction in the fluidised bulk density or a parameter indicative thereof becomes irreversible.

U.S. Pat. No. 5,436,304 relates to a process for polymerising alpha-olefin(s) in a gas phase reactor having a fluidised bed and a fluidising medium wherein the fluidising medium serves to control the cooling capacity of the reactor and wherein the bulk density function (Z) is maintained at a value equal to or greater than the calculated limit of the bulk density function.

WO 94/28032, the contents of which are hereby incorporated by reference, relates to a continuous gas fluidised bed process in which the recycle gas stream is cooled to a temperature sufficient to form a liquid and a gas. By separating the liquid from the gas and then feeding the liquid directly into the fluidised bed at or above the point at which the gaseous stream passing through the fluidised bed has substantially reached the temperature of the gaseous stream being withdrawn from the reactor, the total amount of liquid which may be reintroduced into the fluidised bed polymerisation reactor for the purpose of cooling the bed by evaporation of the liquid can be increased thereby enhancing the level of cooling to achieve higher levels of productivity.

During operation of the process described in WO 94/28032 entrainment of catalyst and/or polymer particles (fines) in the gaseous recycle stream may lead to fouling or blocking of the separator used to separate the liquid from the gas. Fouling of the separator may also occur when the process is operated without cooling the gaseous recycle stream to a temperature at which liquid condenses out, for example, during start-up of the process of WO 94/28032.

SUMMARY OF THE INVENTION

It has now been found that this problem may be overcome or at least mitigated by charging the separator with liquid.

Thus, according to the present invention there is provided a continuous gas fluidised bed process for the polymerisation of olefin monomer selected from (a) ethylene, (b) propylene, (c) mixtures of ethylene and propylene and (d) one or more other alpha-olefins mixed with (a), (b) or (c), in a fluidised bed reactor by continuously recycling a gaseous stream comprising at least some of the ethylene and/or propylene through a fluidised bed in said reactor in the presence of a polymerisation catalyst under reactive conditions, at least part of said gaseous stream withdrawn from said reactor being passed through a separator, characterised in that:

(a) the separator is charged with liquid;
(b) the separator is maintained at least partially filled with liquid;
(c) the gaseous stream fed to the separator has entrained therein catalyst and/or polymer particles;
(d) substantially all of the entrained catalyst and/or polymer particles are separated from the gaseous stream in the separator and are maintained in a suspended state in the liquid in the separator; and
(e) optionally the liquid from the separator is introduced directly into the fluidised bed.

Preferably, at least part of the gaseous stream withdrawn from the reactor is cooled to a temperature at which liquid condenses out, and at least part of the condensed liquid is separated from the gaseous stream in the separator.

Preferably the liquid from the separator is introduced directly into the fluidised bed above the upper limit of the temperature gradient between the entering fluidising gas (the gaseous stream fed to the reactor) and the remainder of the bed.

BRIEF DESCRIPTION OF THE DRAWING

Processes according to the present invention will now be illustrated with reference to the accompanying drawing.

The FIGURE shows diagrammatically a process according to the present invention.

DETAILED DESCRIPTION OF THE INVENTION

Figure 1:
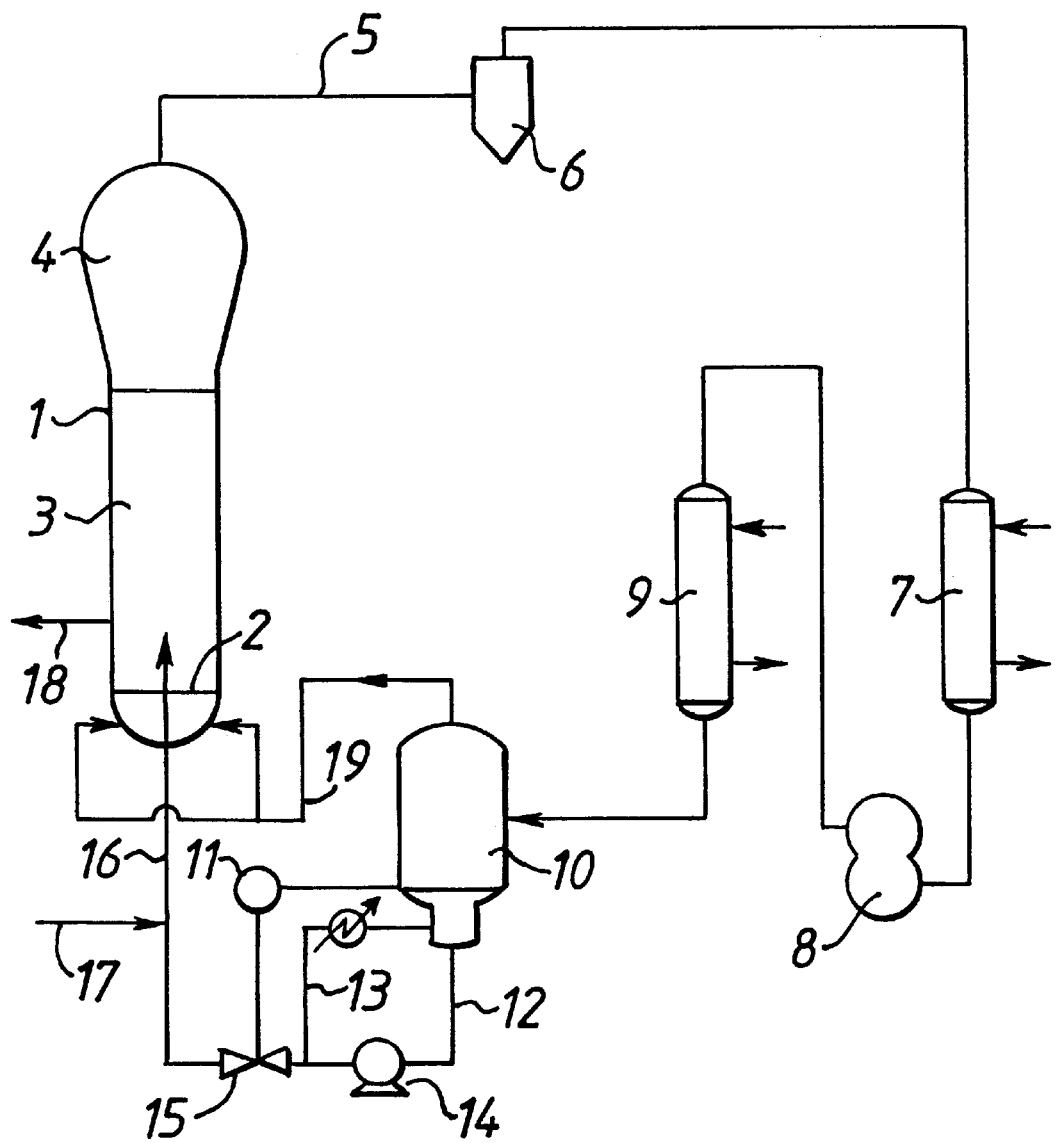

The present invention solves or at least mitigates the problem defined above by maintaining the catalyst and/or polymer particles in a suspended state in the liquid in the separator.

The liquid which is charged to the separator may comprise condensable comonomers, for example, butene, hexene, 4-methylpent-1-ene and octene or inert condensable liquids, for example, pentane, isopentane, butane or hexane.

The gaseous recycle stream withdrawn from the reactor comprises unreacted gaseous monomers, and optionally, inert hydrocarbons, inert gases such as nitrogen, reaction activators or moderators such as hydrogen, as well as entrained catalyst and/or polymer particles.

The recycled gaseous stream fed to the reactor additionally comprises sufficient make-up monomers to replace those monomers polymerised in the reactor.

The process according to the present invention is suitable for the manufacture of polyolefins in the gas phase by the polymerisation of one or more olefins at least one of which is ethylene or propylene. Preferred alpha-olefins for use in the process of the present invention are those having from 3 to 8 carbon atoms. However, small quantities of alpha olefins having more than 8 carbon atoms, for example 9 to 18 carbon atoms, can be employed if desired. Thus, it is possible to produce homopolymers of ethylene or propylene or copolymers of ethylene or propylene with one or more $C_3$–$C_8$ alpha-olefins. The preferred alpha-olefins are but-1-ene, pent-1-ene, hex-1-ene, 4-methylpent-1-ene, oct-1-ene and butadiene. Examples of higher olefins that can be copolymerised with the primary ethylene or propylene monomer, or as partial replacement for the $C_3$–$C_8$ alpha-olefin comonomer are dec-1-ene and ethylidene norbornene.

When the process is used for the copolymerisation of ethylene or propylene with alpha-olefins the ethylene or propylene is present as the major component of the copolymer, and preferably is present in an amount at least 70%, more preferably at least 80% by weight of the total monomers/comonomers.

The process according to the present invention may be used to prepare a wide variety of polymer products for example linear low density polyethylene (LLDPE) based on copolymers of ethylene with butene, 4-methylpent-1-ene or hexene and high density polyethylene (HDPE) which can be for example, homopolyethylene or copolymers of ethylene with a small portion of higher alpha olefin comonomer, for example, butene, pent-1-ene, hex-1-ene or 4-methylpent-1-ene.

The liquid which condenses out of the gaseous recycle stream can be a condensable monomer, e.g. butene, hexene, or octene used as a comonomer for the production of LLDPE or may be an inert condensable liquid, e.g. butane, pentane, or hexane.

In this specification, the term "condensable" means that the dew point of the gaseous composition comprising the condensable material is above the lowest temperature of the recycle loop.

It is important that the liquid should vaporise within the bed under the polymerisation conditions being employed so that the desired cooling effect is obtained and to avoid substantial accumulation of liquid within the bed.

The process is particularly suitable for polymerising olefins at a pressure of between 0.5 and 6 MPa and at a temperature of between 30° C. and 130° C. For example for LLDPE production the temperature is suitably in the range 75–90° C. and for HDPE the temperature is typically 80–105° C. depending on the activity of the catalyst used.

The polymerisation reaction may be carried out in the presence of a catalyst system of the Ziegler-Natta type, consisting of a solid catalyst essentially comprising a compound of a transition metal and of a cocatalyst comprising an organic compound of a metal (i.e. an organometallic compound, for example an alkylaluminium compound). High-activity catalyst systems have already been known for a number of years and are capable of producing large quantities of polymer in a relatively short time, and thus make it possible to avoid a step of removing catalyst residues from the polymer. These high-activity catalyst systems generally comprise a solid catalyst consisting essentially of atoms of transition metal, of magnesium and of halogen. It is also possible to use a high-activity catalyst consisting essentially of a chromium oxide activated by a heat treatment and associated with a granular support based on a refractory oxide. The process is also suitable for use with metallocene catalysts and Ziegler catalysts supported on silica.

The catalyst may suitably be employed in the form of a prepolymer powder prepared beforehand during a prepolymerisation stage with the aid of a catalyst as described above. The prepolymerisation may be carried out by any suitable process, for example, polymerisation in a liquid hydrocarbon diluent or in the gas phase using a batch process, a semi-continuous process or a continuous process.

Preferably, substantially the whole of the gaseous recycle stream is cooled and the condensed liquid is separated and substantially the whole of the separated liquid is introduced directly into the fluidised bed.

The gaseous recycle stream is suitably cooled by means of a heat exchanger or exchangers to a temperature such that liquid is condensed in the gaseous recycle stream. Suitable heat exchangers are well known in the art.

The gaseous recycle stream leaving the top of the reactor has entrained therein a quantity of catalyst and/or polymer particles and the majority of these may be removed from the recycle gaseous stream by means of a cyclone. A small proportion of these particles remain entrained in the gaseous recycle stream and are separated, together with the condensed liquid, from the gaseous recycle stream in the gas/liquid separator. Alternatively, the cyclone may be eliminated and substantially all of the entrained catalyst and/or polymer particles are separated from the gaseous recycle stream in the gas/liquid separator. The separated fines may be reintroduced into the fluidised bed together with the liquid stream from the gas/liquid separator. Preferably, the fines are reintroduced into the fluidised bed suspended in the liquid stream from the gas/liquid separator. Suitably, these particles may be kept in suspension and thus avoid fouling of the gas/liquid separator by, for example, stirring the liquid in the gas/liquid separator (mechanical agitation), bubbling a gaseous stream through the liquid or continuously circulating the liquid by means of an external loop i.e. liquid is continuously withdrawn from and returned to the separator. Preferably, a portion of the liquid in the separator is continuously circulated by means of a pump. Suitably, sufficient liquid is circulated to allow the pump to be operated in a continuous manner. A portion of the circulating liquid may be introduced directly into the fluidised bed via a valve which opens to allow liquid to enter a supply line to the fluidised bed. Preferably, the valve is operated via a liquid level controller which monitors and maintains the level of liquid in the separator between set limits.

The gaseous recycle stream may also comprise inert hydrocarbons used for the injection of catalyst, reaction activators or moderators into the reactor.

Make-up monomers, for example, ethylene or propylene to replace monomers consumed by the polymerisation reaction may be added to the gaseous recycle stream at any suitable location.

Make-up condensable comonomers, for example, butene, hexene, 4-methylpent-1-ene and octene, to replace condensable comonomers consumed by the polymerisation reaction may be introduced as liquids and added to the gaseous recycle gas stream at any suitable location.

Suitable separators are for example cyclone separators, large vessels which reduce the velocity of the gas stream to effect separation of the condensed liquid and fines (knock-out drums), demister type gas-liquid separators and liquid scrubbers, for example, venturi scrubbers. Such separators are well known in the art.

The use of a demister type of gas-liquid separator is particularly advantageous in the process of the present invention.

A further advantage of using a demister type of separator is that the pressure drop within the separator can be lower than in other types of separators thereby enhancing the efficiency of the overall process.

A particularly suitable demister separator for use in the process of the present invention is a commercially available vertical gas separator known as a "Peerless" (Type DPV P8X). This type of separator uses the coalescence of liquid droplets on a baffle arrangement to separate the liquid from the gas. A large liquid reservoir is provided in the bottom of the separator for collection of the liquid and into which the condensable liquid is charged before commencing cooling of the gaseous recycle stream to a temperature at which liquid condenses out. The liquid reservoir enables the liquid to be stored thereby providing control over the introduction of the liquid from the separator into the fluidised bed. This type of separator is very efficient and gives 100% separation of condensed liquid from the gas stream. The separated liquid washes any fines from the baffle arrangement thus avoiding fouling of the baffles.

The liquid from the separator together with any fines is suitably introduced into the fluidised bed above the upper limit of the temperature gradient between the entering fluidising gas and the remainder of the bed. The introduction of liquid from the separator may be at a plurality of points within this region of the fluidised bed and these may be at different heights within this region. The point or points of introduction of the liquid are arranged such that the local concentration of liquid does not adversely affect the fluidisation of the bed or the quality of the product, and to enable the liquid to disperse rapidly from each point and vaporise in the bed to remove the heat of polymerisation from the exothermic reaction. In this way the amount of liquid introduced for cooling purposes may much more closely approach the maximum loading that can be tolerated without disturbing the fluidisation characteristics of the bed and hence offers the opportunity to achieve enhanced levels of reactor productivity.

The liquid can, if desired, be introduced into the fluidised bed at different heights within the bed. Such a technique can facilitate improved control over comonomer incorporation. Controlled metering of liquid into the fluidised bed provides useful additional control over the temperature profile of the bed and, in the case that the liquid contains comonomer, provides useful control over the comonomer incorporation into the copolymer.

The liquid is preferably introduced into the lower part of the region of the fluidised bed above the upper limit of the temperature gradient between the entering fluidising gas and the remainder of the bed. Commercial processes for the gas fluidised bed polymerisation of olefins are generally operated under substantially isothermal, steady state conditions. However, although almost all of the fluidised bed is maintained at the desired substantially isothermal polymerisation temperature, there normally exists a temperature gradient in the region of the bed immediately above the point of introduction of the cooled gas stream into the bed. The lower temperature limit of this region wherein the temperature gradient exists is the temperature of the incoming cool gas stream, and the upper limit is the substantially isothermal bed temperature. In commercial reactors of the type which employ a fluidisation grid, typically 10–15 m high, this temperature gradient normally exists in a layer of about 15 to 30 cm (6 to 12 inches) above the grid.

In order to gain the maximum benefit of the cooling of the liquid from the separator it is important that the liquid is introduced into the bed above the region where this temperature gradient exists, i.e. in the part of the bed which has substantially reached the temperature of the gaseous recycle stream leaving the reactor.

The point or points of introduction of the liquid into the fluidised bed may for example be approximately 50–200 cm, preferably 50–70 cm above the fluidisation grid.

In practice, the temperature profile within the fluidised bed may first be determined during polymerisation using, for example, thermocouples located in or on the walls of the reactor. The point or points of introduction of the liquid is/are then arranged to ensure that the liquid enters into the region of the bed at which the returned gas stream has substantially reached the temperature of the gaseous recycle stream being withdrawn from the reactor.

It is important to ensure that the temperature within the fluidised bed is maintained at a level which is below the sintering temperature of the polyolefin constituting the bed.

The gas from the separator is recycled to the bed, normally into the bottom of the reactor. If a fluidisation grid is employed, such recycle is normally to the region below the grid, and the grid facilitates uniform distribution of the gas to fluidise the bed. The use of a fluidisation grid is preferred.

The process of the present invention is operated with a gas velocity in the fluidised bed which must be greater than or equal to that required to achieve a bubbling bed. The minimum gas velocity is generally approximately 6 cm/sec but the process of the present invention is preferably carried out using a gas velocity in the range 30 to 100, most preferably 50 to 70 cm/sec.

In the process according to the present invention the catalyst or prepolymer can, if desired, be introduced into the fluidised bed directly with the liquid stream from the separator. This technique can lead to improved dispersion of the catalyst or prepolymer in the bed.

If desired, liquid or liquid-soluble additives, for example, activators, cocatalysts and the like, can be introduced into the bed together with the liquid stream from the separator.

In the case that the process of the present invention is employed to make ethylene homo- or copolymers, make-up ethylene, for example, to replace the ethylene consumed during the polymerisation, may be advantageously introduced into the separated gas stream prior to its reintroduction into the bed (for example below the fluidisation grid if such is employed). By adding the make-up ethylene to the separated gas stream rather than into the gaseous recycle stream before separation, the quantity of liquid which may be recovered from the separator may be increased and the productivity improved.

The liquid stream from the separator may be subjected to additional cooling (e.g. using refrigeration techniques) before being introduced into the fluidised bed. Preferably, the liquid stream is subjected to additional cooling whilst being externally circulated, as described above, by including a cooler in the external loop. This allows an even greater cooling effect in the bed than is provided by the liquid evaporative effect (latent heat of evaporation) alone, thereby providing further potential increases in productivity of the process. Cooling of the liquid stream from the separator may be achieved by use of suitable cooling means e.g. a simple heat exchanger or refrigerator located between the separator and the reactor or between the point at which liquid is removed from and reintroduced to the separator. A further advantage of this particular aspect of the present invention is that, by cooling the liquid before introduction into the fluidised bed, any tendency for catalyst or prepolymer which may be contained in the liquid stream to cause polymerisation before introduction into the bed will be reduced.

The liquid may be introduced into the fluidised-bed by suitably arranged injection means. A single injection means may be used or a plurality of injection means may be arranged within the fluidised bed.

A preferred arrangement is to provide a plurality of injection means substantially equally spaced in the fluidised bed in the region of the introduction of the liquid. The number of injection means used is that number which is required to provide sufficient penetration and dispersion of liquid at each injection means to achieve good dispersion of liquid across the bed. A preferred number of injection means is four.

Each of the injection means may, if desired, be supplied with liquid from the separator by means of a common conduit suitably arranged within the reactor. This can be provided, for example, by means of a conduit passing up through the centre of the reactor.

The injection means are preferably arranged such that they protrude substantially vertically into the fluidised bed, but may be arranged such that they protrude from the walls of the reactor in a substantially horizontal direction.

The rate at which liquid can be introduced into the bed depends primarily on the degree of cooling desired in the bed, and this in turn depends on the desired rate of production from the bed. The rates of production obtainable from commercial fluidised bed polymerisation processes for the polymerisation of olefins depend, inter alia on the activity of the catalysts employed, and on the kinetics of such catalysts. Thus, for example, when catalysts having very high activity are employed, and high production rates are desired, the rate of liquid addition will be high. Typical rates of liquid introduction may be, for example, in the range 0.25 to 4.9, preferably 0.3 to 4.9 cubic meters of liquid per cubic meter of bed material per hour, or even higher. For conventional Ziegler catalysts of the "superactive" type (i.e. those based on transition metal, magnesium halide and organometallic cocatalyst, the rate of liquid addition may be, for example, in the range 0.5 to 1.5 cubic meters of liquid per cubic meter of bed material per hour.

In the process of the present invention the weight ratio of liquid:total gas which may be introduced into the bed can be for example in the range 1:100 to 2:1, preferably in the range 5:100 to 85:100, most preferably in the range 6:100 to 25:100. By total gas is meant the gas which is returned to the reactor to fluidise the bed together with any gas used to assist in the operation of the injection means, e.g. atomising gas. The atomising gas may suitably be an inert gas, for example, nitrogen but is preferably make-up ethylene.

By injecting the liquid into the fluidised bed in this way any catalyst which is present in the liquid may benefit from the localised cooling effect of the liquid penetration surrounding each injection means which may avoid hot spots and consequent agglomeration.

Any suitable injection means may be used provided the penetration and dispersion of the liquid into the bed from such means is sufficient to achieve a good dispersion of liquid across the bed.

The preferred injection means is a nozzle or a plurality of nozzles which include gas-induced atomising nozzles in which a gas is used to assist in the injection of the liquid, or liquid-only spray-type nozzles.

According to another aspect of the present invention there is provided a continuous gas fluidised bed process for the polymerisation of olefin monomer selected from (a) ethylene, (b) propylene (c) mixtures of ethylene and propylene and (d) one or more other alpha-olefins mixed with (a), (b) or (c), in a fluidised bed reactor by continuously recycling a gaseous stream comprising at least some of the ethylene and/or propylene through a fluidised bed in said reactor in the presence of a polymerisation catalyst under reactive conditions, at least part of the said gaseous stream withdrawn from said reactor being cooled to a temperature at which liquid condenses out, separating at least part of the condensed liquid from the gaseous stream in a separator, characterised in that:

(a) the separator is charged with liquid,
(b) the separator is maintained at least partially filled with liquid;
(c) the gaseous stream fed to the separator has entrained therein catalyst and/or polymer particles;
(d) substantially all of the entrained catalyst and/or polymer particles are separated from the gaseous stream in the separator and are maintained in a suspended state in the liquid in the separator; and
(e) liquid from the separator is introduced directly into the fluidised bed by means of one or more liquid-only nozzles or gas-induced atomising nozzles.

The injection means are suitably nozzles which protrude into the bed through the reactor wall (or through a supporting grid for the bed) and which carry one or more jet outlets to deliver the liquid to the bed.

It is important in the process of the present invention to achieve good dispersion and penetration of the liquid in the bed. Factors which are important in achieving good penetration and dispersion are the momentum and direction of the liquid entering the bed, the number of points of introduction of the liquid per unit cross-sectional area of the bed, and the spatial arrangement of the points of introduction of the liquid.

The liquid from the separator may be introduced into the reactor as one or more jets of liquid alone, or one or more jets of liquid and gas, from one or more jet outlets, each jet having a horizontal momentum flux in the case of the liquid only jets of at least $100 \times 10^3$ Kg s$^{-1}$ m$^{-2}$xm s$^{-1}$ and in the case of the gas/liquid jets of $200 \times 10^3$ Kg s$^{-1}$ m$^{-2}$xm s$^{-1}$ wherein the horizontal momentum flux is defined as the mass flow rate of liquid (kilogrammes per second) in the horizontal direction per unit cross-sectional area (square meters) of the jet outlet from which it emerges, multiplied by the horizontal component of the velocity (meters per second) of the jet.

Preferably the momentum flux of each of the liquid or liquid/gas jets is at least $250 \times 10^3$ and most preferably at least $300 \times 10^3$ Kg s$^{-1}$ m$^{-2}$xm s$^{-1}$ Particularly preferred is the use of a horizontal momentum flux in the range $300 \times 10^3$ to $500 \times 10^3$ Kg s$^{-1}$ m$^{-2}$xm s$^{-1}$. In the case that the liquid jet emerges from the jet outlet in a direction other than horizontal, the horizontal component of the velocity of the jet is calculated from Cosine Q° × actual jet velocity, wherein Q° is the angle tile jet makes with the horizontal.

The direction of motion of the one or more liquid or liquid/gas jets into the bed is preferably substantially horizontal. In the case that one or more of the jet outlets deliver the liquid or liquid/gas jets in a direction other than horizontal, preferably these are directed at an angle not greater than 45°, most preferably not more than 20° to the horizontal.

Suitable gas-induced atomising nozzles and liquid-only nozzles are as described in WO 94/28032.

Before commencing the introduction of liquid by use of the process according to the present invention the gas phase fluidised bed polymerisation may be started by charging the bed with particulate polymer particles, charging the separator with liquid and then initiating the gas flow through the bed.

The FIGURE illustrates a gas-phase fluidised bed reactor consisting essentially of a reactor body 1 which is generally an upright cylinder having a fluidisation grid 2 located in its base. The reactor body comprises a fluidised bed 3 and a velocity reduction zone 4 which is generally of increased cross-section compared to the fluidised bed.

The gaseous reaction mixture leaving the top of the fluidised bed reactor constitutes recycle gaseous stream and is passed via line 5 to a cyclone 6 for the separation of the majority of the fines. Removed fines may suitably be returned to the fluidised bed. The recycle gaseous stream leaving the cyclone passes to a first heat exchanger 7, a compressor 8 and then to a second heat exchanger 9.

The heat exchanger or exchangers can be arranged either upstream or downstream of the compressor 8, preferably as shown with one each side of the compressor.

After cooling to a temperature such that a condensate is formed, the resultant gas-liquid mixture is passed to the separator 10 where the liquid is removed. Before cooling of the gaseous recycle stream to a temperature at which liquid condenses out, liquid is charged to the separator. The level of liquid in the separator is monitored by a liquid level controller 11.

The gas leaving the separator is recycled via line 19 to the bottom of the reactor 1. The gas is passed via the fluidisation grid 2 to the bed 3 thereby ensuring that the bed is maintained in a fluidised condition.

The liquid from the separator 10 is circulated via lines 12 and 13 and by means of a pump 14 located in line 12. A portion of the circulated liquid passes via a valve 15 to the reactor 1 via line 16. The valve 15 is controlled by means of a liquid level controller 1.

Catalyst or prepolymer may be fed to the reactor via line 17 into the liquid stream from the separator.

Product polymer particles may be suitably removed from the reactor via line 18.

The arrangement shown in the FIGURE is particularly suitable for use when retrofitting existing gas phase polymerisation reactors using fluidised bed processes.

We claim:

1. In a continuous gas fluidized bed process for the polymerization of an olefin monomer selected from the group consisting of (a) ethylene, (b) propylene, (c) mixtures of ethylene and propylene and (d) one or more other alpha-olefin mixed with (a), (b) or (c) in a fluidized bed reactor by passing a gaseous stream comprising at least some of the ethylene and/or propylene through a fluidized bed in said reactor in the presence of a polymerization catalyst under reactive conditions, withdrawing a gaseous stream having entrained therein catalyst and/or polymer particles from said reactor, at least part of said gaseous stream withdrawn from said reactor being passed through a separator to separate liquid therefrom, and continuously recycling separated gas back to the reactor, the improvement comprising:

charging the separator with liquid;

maintaining the separator at least partially filled with the liquid; and separating substantially all of the entrained catalyst and/or polymer particles from the gaseous stream in the separator while agitating the liquid in the separator to maintain substantially all of the separated particles in a suspended state in the liquid in the separator.

2. The process of claim 1, wherein at least a part of the separated liquid in the separator is introduced directly into the fluidized bed of the reactor.

3. The process of claim 1, in which at least part of the gaseous stream withdrawn from the reactor is cooled to a temperature at which liquid condenses out of the stream, and at least part of the condensed liquid is separated from the gaseous stream in the separator.

4. The process of claim 1, in which the particles are maintained in the suspended state in the liquid in the separator by stirring the liquid in the separator, or by continuously circulating the liquid by means of an external loop and returning a portion of the circulated liquid to the separator at a point below the level of the liquid in the separator.

5. The process of claim 2, in which the entrained catalyst and/or polymer particles separated from the gaseous stream in the separator are reinforced into the fluidized bed together with the separated liquid from the separator.

6. The process of claim 2, in which the separated liquid is introduced directly into the fluidized bed at a rate in the range of from 0.25 to 4.9 cubic meters of liquid per cubic meter of bed material per hour.

7. The process of claim 2, in which the ratio of liquid:total gas which is introduced into the bed is in the range of from 1:100 to 2:1.

8. In a continuous gas fluidized bed process for the polymerization of an olefin monomer selected from the group consisting of (a) ethylene, (b) propylene, (c) mixtures of ethylene and propylene and (d) one or more other alpha-olefins mixed with (a), (b) or (c), in a fluidized bed reactor by passing a gaseous stream comprising at least some of the ethylene and/or propylene through a fluidized bed in said reactor in the presence of a polymerization catalyst under reactive conditions, withdrawing a gaseous stream having entrained therein catalyst and/or polymer particles from said reactor, cooling at least part of the gaseous stream withdrawn from said reactor to a temperature at which liquid condenses out, separating at least part of the condensed liquid from the gaseous stream in a separator, and continuously recycling separated gas back to the reactor, the improvement comprising:

charging the separator with liquid;

maintaining the separator at least partially filled with the liquid;

separating substantially all of the entrained catalyst and/or polymer particles from the gaseous stream in the separator while agitating the liquid in the separator to maintain substantially all of the separated particles in a suspended state in the liquid in the separator; and introducing at least a part of the separated liquid in the separator directly into the fluidized bed of the reactor by means of one or more liquid only nozzles or gas-induced atomizing nozzles.

9. The process of claim 8, in which the liquid is introduced into the reactor as one or more jets of liquid alone or one or more jets of liquid and gas from one or more jet outlets, each jet having a horizontal momentum flux in the case of liquid only jets of at least $100 \times 10^3$ Kg s$^{-1}$ m$^{-2}$×m s$^{-1}$ and in the case of gas/liquid jets of $200 \times 10^3$ Kg s$^{-1}$ m$^{-2}$×m s$^{-1}$.

10. The process of claim 9, in which the one or more liquid or liquid/gas jets are directed substantially horizontally into the bed of the reactor.

11. The process of claim 1, wherein the polymerization is started by charging the bed of the reactor with particulate polymer particles and the separator with liquid, and then initiating the flow of the gaseous stream through the bed.

12. The process of claim 8, wherein the polymerization is started by charging the bed of the reactor with particulate polymer particles and the separator with liquid, and then initiating the flow of the gaseous stream through the bed.

* * * * *